United States Patent [19]
Baek et al.

[11] Patent Number: 5,745,530
[45] Date of Patent: Apr. 28, 1998

[54] DIGITAL DATA RECOVERING APPARATUS

[75] Inventors: Hyun-gee Baek, Anyang; Young-hoon Chang, Suwon; Ho-rang Jang, Incheon, all of Rep. of Korea

[73] Assignee: Samsung Electronics Co., Ltd., Kyungki-do, Rep. of Korea

[21] Appl. No.: 581,684

[22] Filed: Dec. 29, 1995

[30]  Foreign Application Priority Data

Dec. 31, 1994 [KR] Rep. of Korea .................. 94-40673

[51] Int. Cl.⁶ ........................................... H04L 27/06
[52] U.S. Cl. ................... 375/342; 375/355; 375/360; 375/371; 327/24
[58] Field of Search ................. 375/340, 342, 375/355, 359, 360, 371, 376; 327/23, 24, 9

[56]  References Cited

U.S. PATENT DOCUMENTS

| | | |
|---|---|---|
| 4,926,355 | 5/1990 | Boreland ................ 364/200 |
| 5,005,150 | 4/1991 | Dent et al. ............. 364/736 |
| 5,208,839 | 5/1993 | Hladik et al. .......... 375/110 |
| 5,349,610 | 9/1994 | Sakamoto et al. ...... 375/359 |
| 5,367,542 | 11/1994 | Guo ...................... 375/359 |
| 5,481,563 | 1/1996 | Hamre ................... 375/359 |
| 5,594,763 | 1/1997 | Nimishakavi .......... 375/376 |

*Primary Examiner*—Don N. Vo
*Attorney, Agent, or Firm*—Leydig, Voit & Mayer, Ltd.

[57]  ABSTRACT

A digital data recovering apparatus which includes an edge detector, a threshold comparator, a position address generator, a position memory, a maximum position detector, a new position generator and a recovered data detector. The digital data recovering apparatus ensures that the desired data and clock reference can be recovered by exactly synchronizing the input data on a communication path, including a noise and/or jitter component.

8 Claims, 10 Drawing Sheets

DIGITAL DATA RECOVERING APPARATUS

BACKGROUND OF THE INVENTION

The present invention relates to a digital data recovering apparatus, and more particularly, to a digital data recovering apparatus for accurately recovering an original data signal and sampling clock signal from a received data signal containing a noise or jitter component from a communication path in a radio receiver.

Recent emphasis on radio receiver/modem technology research has focused on the utilization of digital signal processing to demodulate signals. Communication using digital modulation techniques requires that the receiver be able to accurately identify the symbol timing epoch, i.e., the optimum sampling point on a waveform for symbol detection. Presently, symbol synchronization is generally derived from an analog signal using analog and/or digital circuits. That is, typical symbol synchronizers use a continuous-time data signal to derive a symbol clock reference. Even so-called digital synchronizer structures and commercially-available digital phase-locked loops process continuous-time rather than sampled, or discrete-time, data signals to derive the symbol clock reference. However, the aforementioned digital, i.e., sampled, demodulation techniques can provide symbol synchronizers for deriving the required symbol clock reference from a discrete-time, rather than the continuous time, data signal. From a practical standpoint, such a symbol synchronizer should provide a stable symbol clock reference even under noisy or lengthy transmission conditions. Furthermore, it is desirable that such symbol synchronizer structures can be embodied using either VLSI technology or a microprocessor.

FIG. 1 is a block diagram illustrating a prior art symbol synchronizer 10. As shown, the symbol synchronizer 10 comprises a one-bit quanitzer 12, a level-transition detector 14, and a binary-quantized digital phase-locked loop (DPLL) 16. For purposes of illustration, an output signal of the binary-quantized DPLL 16 is represented as a symbol clock for a Manchester signal format and as a symbol clock via a one-half symbol delay block 18, for a non-return-to-zero (NRZ) signal format. The reason for the one-half symbol delay block 18 for the NRZ signal is that, in the absence of noise, NRZ transitions can only occur at the symbol boundaries which are spaced apart one-half symbol from the timing epochs of the NRZ signals.

Here, a sampled data signal at baseband is initially quanitzed to a one-bit unit by the one-bit quantizer 12. The one-bit output signal from the one-bit quantizer 12 is supplied to the level-transition detector 14. The level-transition detector 14 receives the quantized data sequence and produces one logic pulse each time a logic level transition occurs therein, provided that the multivibrator output signal triggered by the previous transition returns to logic level 0, as shown in FIG. 2. A timing diagram may be utilized to illustrate the operation of the level-transition detector 14. In the timing diagram of FIG. 3, T represents a sampling interval, 8T is a symbol period, and the desired symbol timing epochs are denoted by arrows 32.

A DPLL 16 is employed to stabilize the data-derived symbol clock since the sequence of pulses from the level-transition detector 14 does not provide a sufficiently reliable symbol clock. A binary-quanitzed DPLL 40 for use in the symbol synchronizer of FIG. 1 is shown schematically in FIG. 4. As shown, the DPLL 40 comprises a binary phase detector 42, a loop filter 44 and a digitally controlled oscillator (DCO) 46. In operation, the binary phase detector 42 determines whether the symbol clock from the DCO 46 leads or lags the level-transition pulse from the level-transition detector 14 (FIG. 2), and the loop filter 44 provides a feedback signal to the DCO 46 for advancing or retarding the phase of the symbol clock accordingly.

The binary phase detector 42 comprises a clocked counter 50 that is enabled by the receipt of a logic pulse from the DCO 46, as shown in FIG. 5. The counter 50 is clocked at the sampling frequency (1/T). A logic pulse from the level-transition detector 14 (FIG. 2) dumps and then resets the counter's accumulated N-bit count signal COUNT1. Accordingly, the count signal COUNT1 is proportional to the timing difference between the data-derived transition pulse and the DCO's symbol timing pulse. The count signal COUNT1 is decoded by decoding logic 52 to determine whether the DPLL's symbol block is leading or lagging the transition pulse derived from the quantized data sequence.

The loop filter 44, which is utilized for controlling the dynamic ranges of the phase-locked loop, is preferably a random walk counter. As shown in FIG. 6, the random walk counter is implemented as an up/down counter 56 that is incremented by pulses on a "lag" signal line and decremented by pulses on a "lead" signal line from the binary phase detector 42 (FIG. 5). As shown in FIG. 6, the count signal COUNT2 from the up/down counter 56 is decoded by decoding logic 58. If COUNT2 reaches a predetermined lower or upper limit value, a single pulse is produced on the "retard" or "advance" line, respectively, so that the up/down counter 56 is reset.

The DCO 46 generates a signal indicating the lead, lag or correspondence in the phase of the symbol clock with respect to the level-transition pulse on the basis of information received from the up/down counter 56 in the loop filter, sets a threshold value with respect to a locking range, and adjusts the phase of the symbol clock if the phase is in this locking range. Thus, the DCO 46 generates the symbol clock and continuously adjusts the phase of the symbol clock by detecting the phase difference between the symbol clock and the input symbol.

However, as shown in FIG. 1, the 1-bit quantizer 12 does not include a filtering device for filtering out a glitch in the signal or distorted data when the received data having a time interval which is much smaller than a basic period (T) of the received data. Essentially, a glitch in the signal or data distorted by noise is received by a receiver, thereby reducing receiver performance. Also, the level-transition detector 14 evaluates the lead or lag of the phase with respect to the symbol clock output from the DCO by only detecting a transition point in the positive direction in the received data and calculates the phase difference. Thus, a monostable multivibrator is required for detecting the transition point in the positive direction, therefore making the circuit structure more complicated.

SUMMARY OF THE INVENTION

It is an object of the present invention to provide a digital data recovering apparatus for accurately recovering an original data signal and sampling clock signal from a received data signal having noise and/or jitter contained therein from a communication path in a radio receiver.

To achieve the above object, there is provided a digital data recovering apparatus. The digital data receiving apparatus comprising an edge detector for detecting an edge where the state of received data is changed from a logic level 0 to a logic level 1 or from a logic level 1 to a logic level 0, a threshold comparator for generating a reference threshold value and comparing the number of the edges detected by the edge detector with the reference threshold value, a position address generator for sampling the received data at an N-time frequency of said received data and generating a position address with respect to 1/N phase, a position memory for storing the position value of the received data with respect to each position address thereof, a maximum position detector for detecting a maximum position by continuously comparing a position value having the maximum value of the edge to be detected with respect to each position value stored in the position memory with a previous maximum position value stored in said position memory, a new position generator for continuously generating a new position by comparing the maximum position detected by the maximum position detector with the current position, and a recovered data detector for recovering the original data from the received data by determining a maximum level value using the clock pulses at the center of symbol data supplied from said position address generator, as well as above and below the center.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
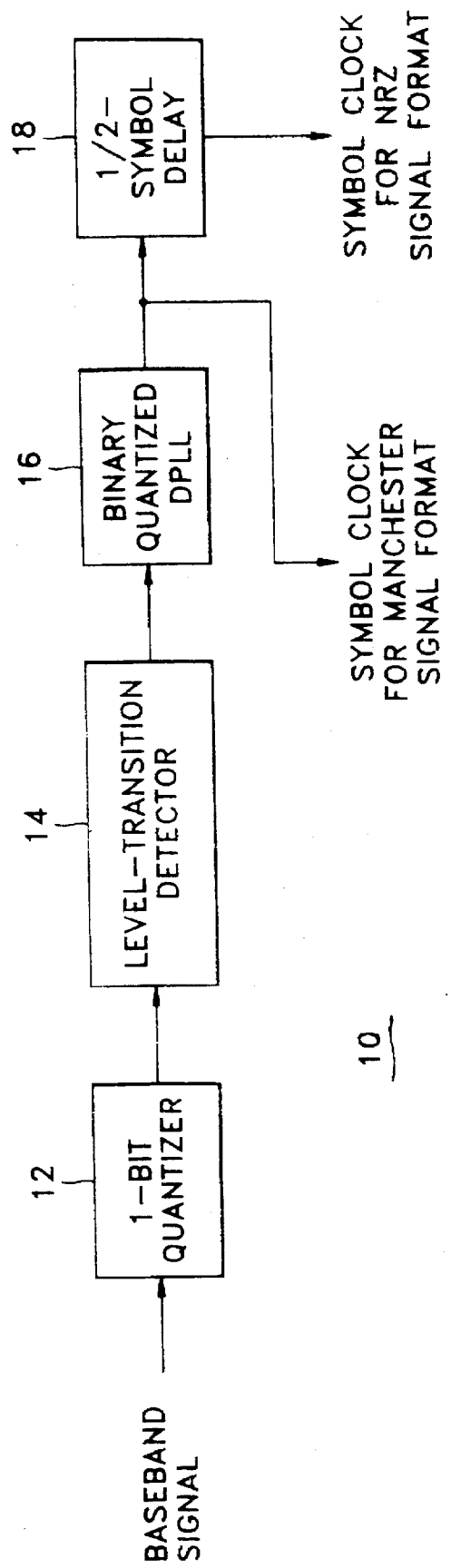
FIG. 1 is a block diagram of a conventional symbol synchronizer for a sampled signal.
Figure 2:
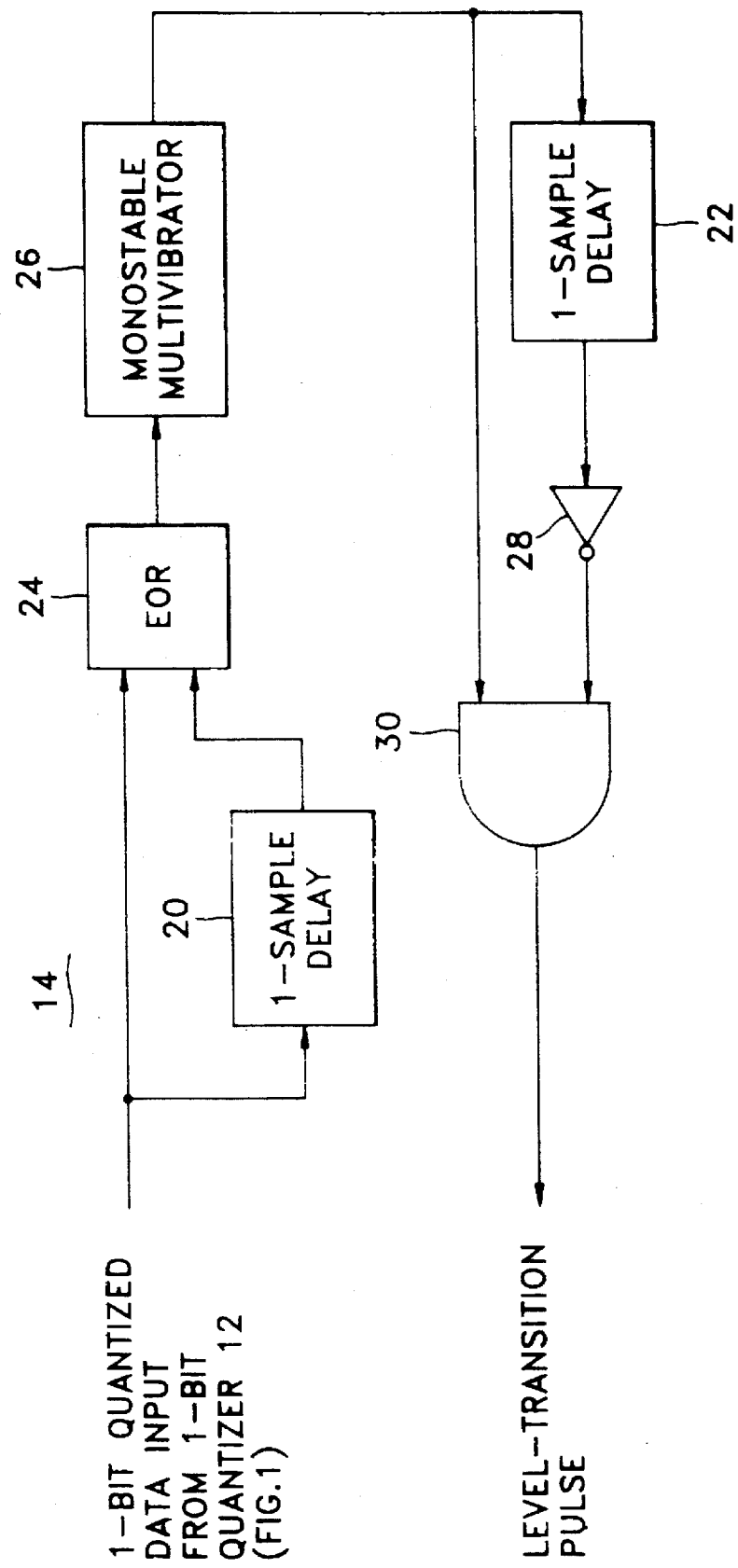
FIG. 2 is a block diagram of a level-transition detector useful in the symbol synchronizer of FIG. 1.
Figure 3:
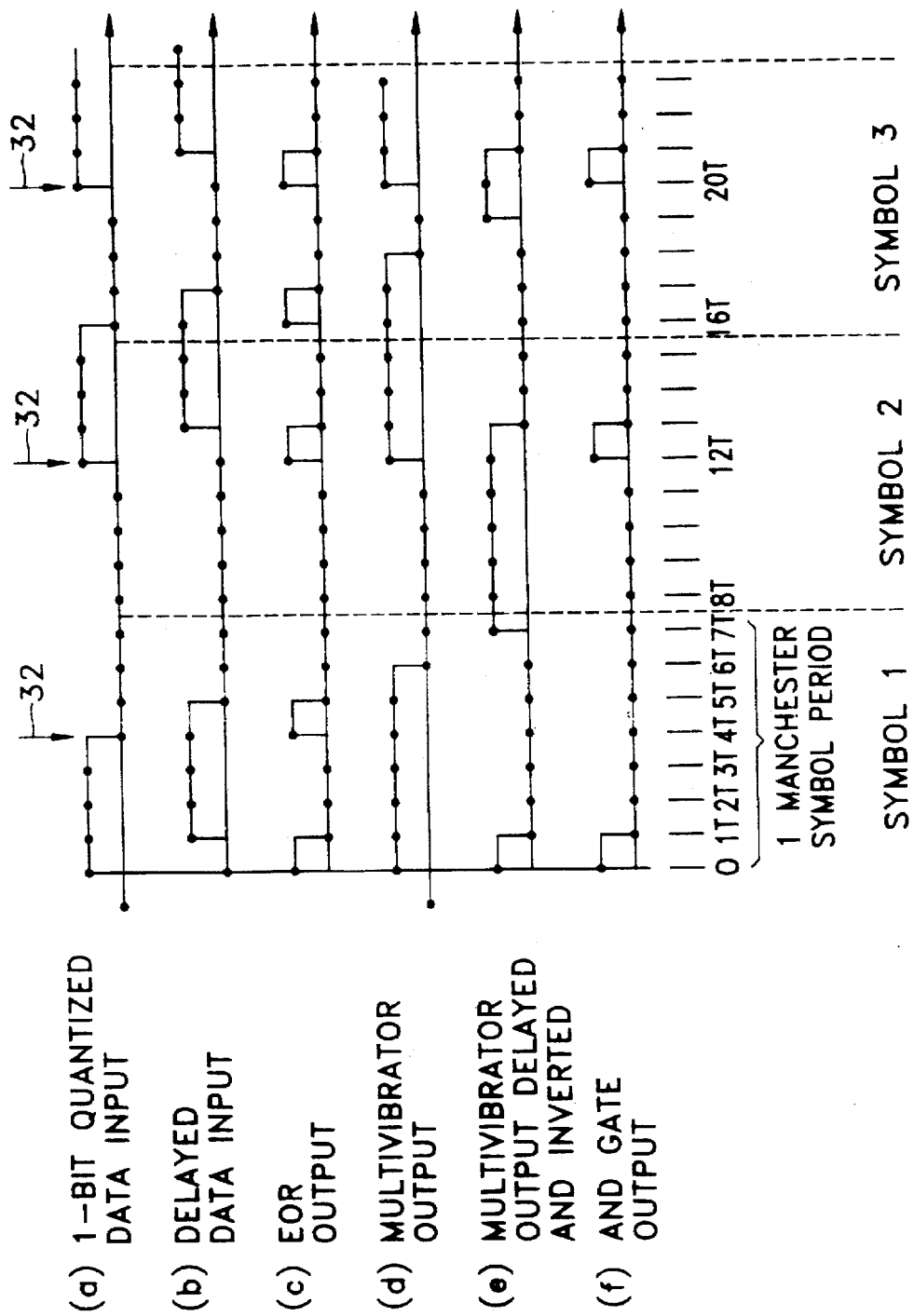
FIG. 3 is a timing diagram illustrating the operation of a level-transition detector of FIG. 2.
Figure 4:
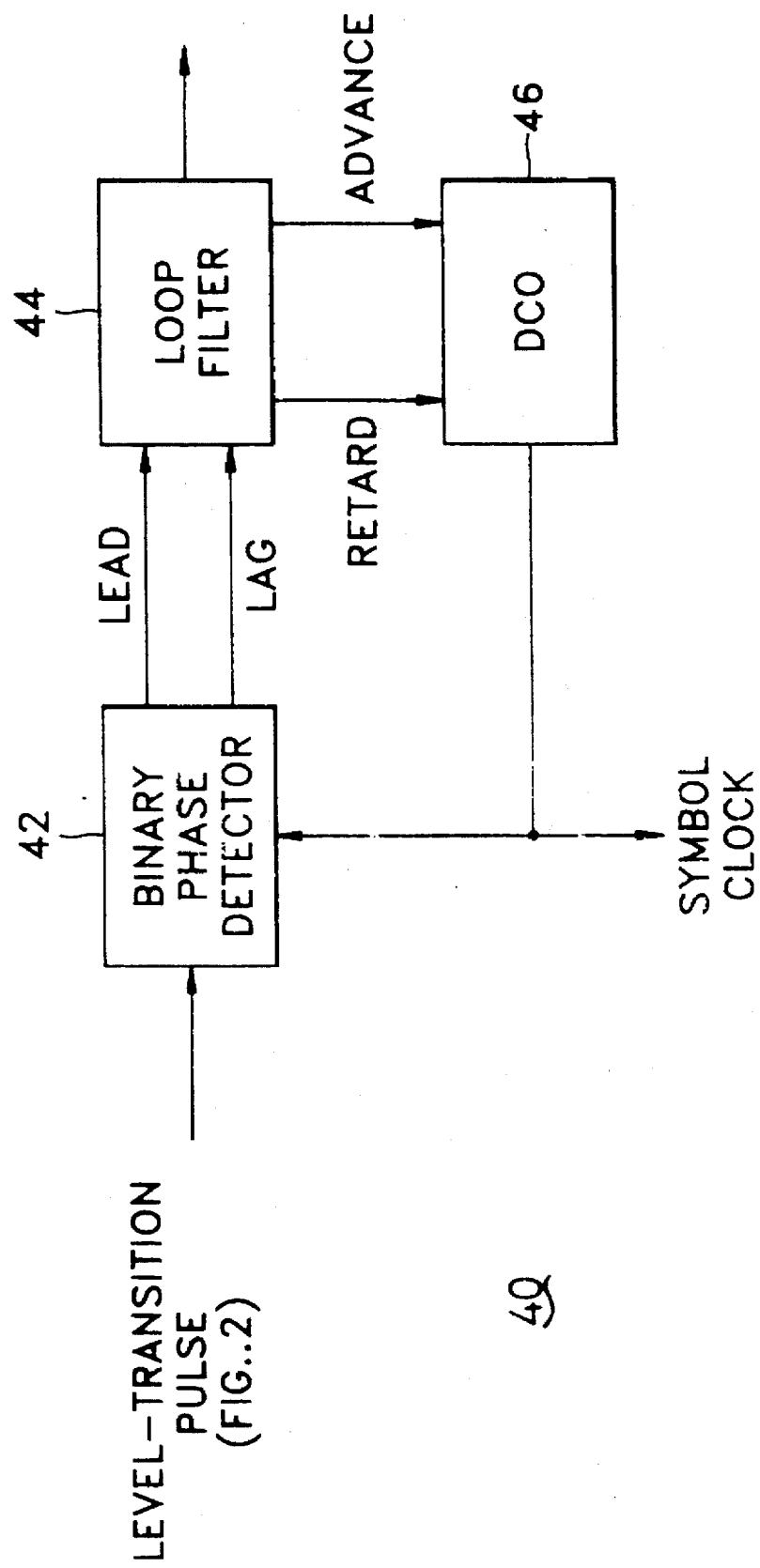
FIG. 4 is a block diagram of a binary-quanitzed digital phase-locked loop (DPLL) useful in the symbol synchronizer of FIG. 1.
Figure 5:
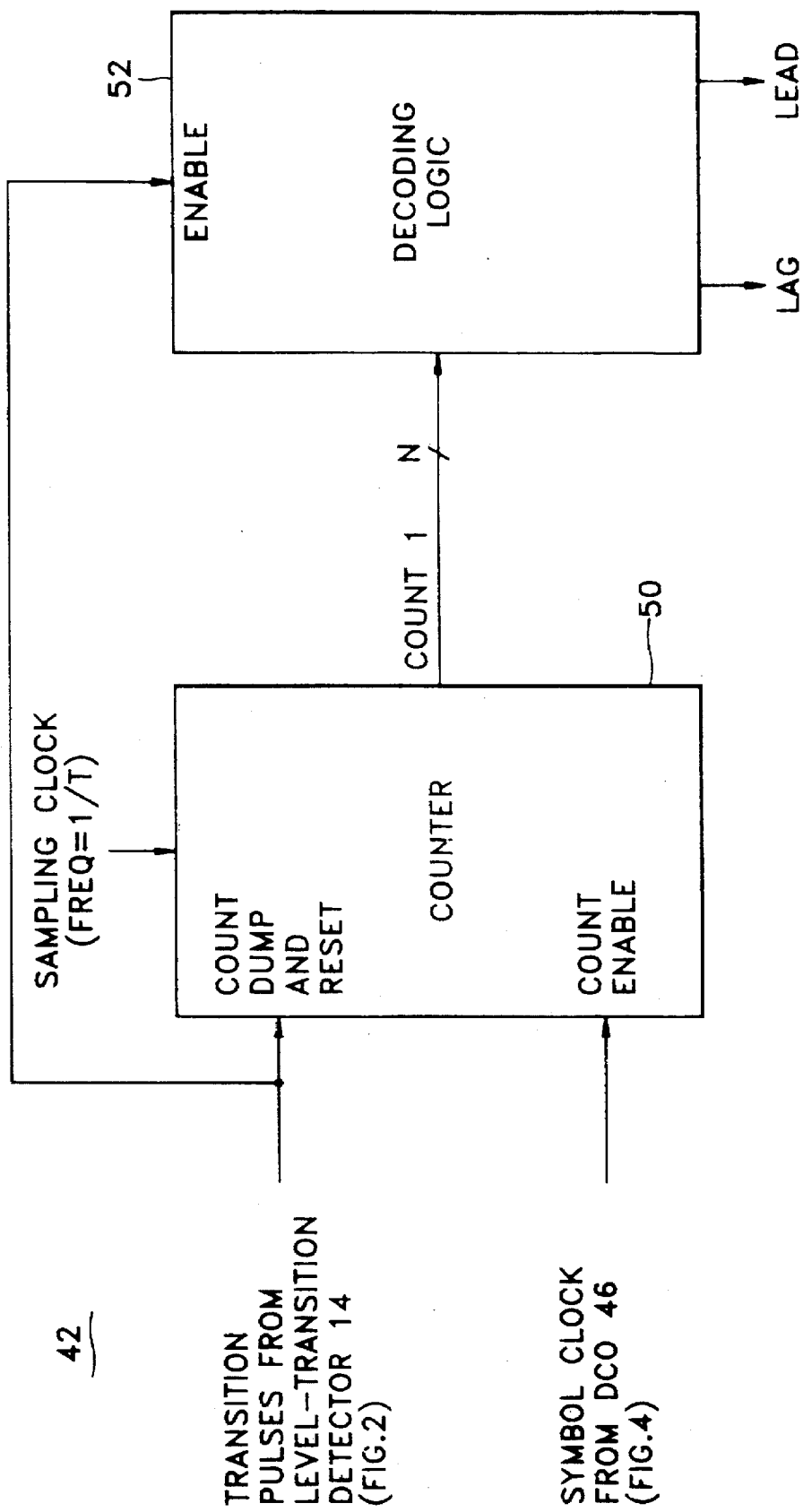
FIG. 5 is a block diagram of a binary phase detector useful in the DPLL of FIG. 4.
Figure 6:
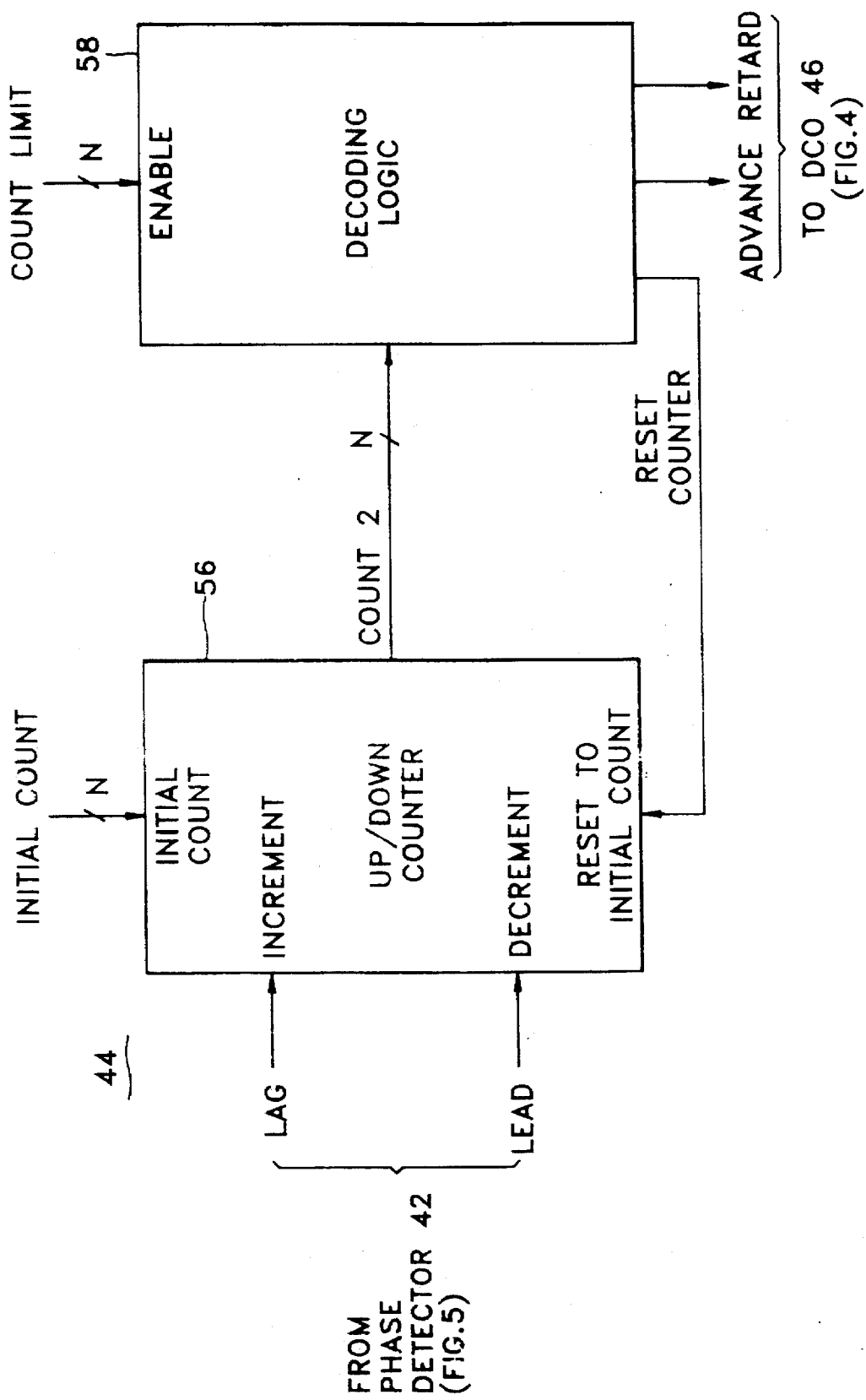
FIG. 6 is a block diagram of a loop filter useful in the DPLL of FIG. 4.
Figure 7:
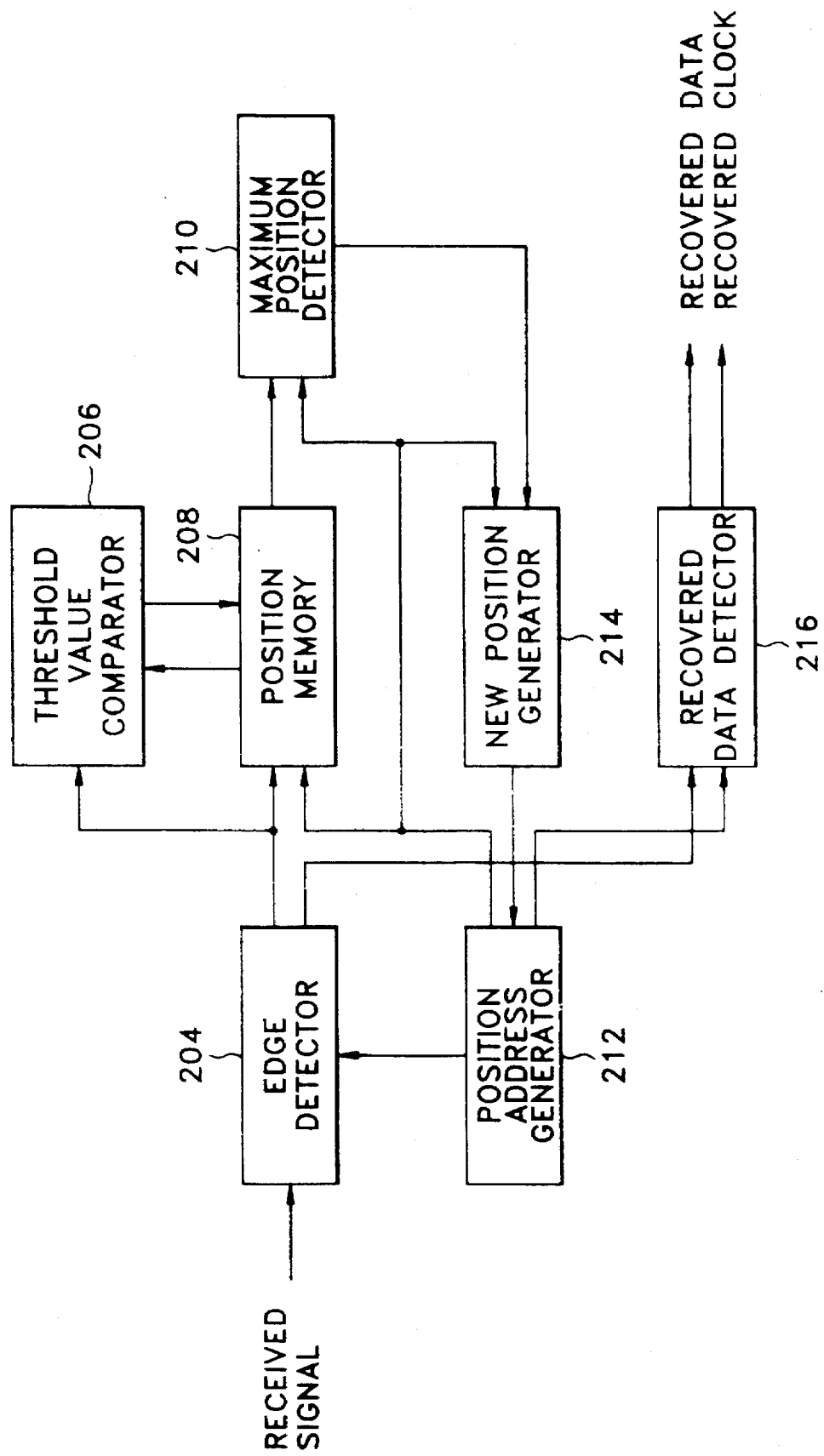
FIG. 7 is a block diagram of a digital data recovering apparatus according to the present invention.

As shown in FIG. 7, a digital data recovering apparatus according to the present invention comprises an edge detector 204 for detecting a transition edge when the state of received data changes from a logic level 0 to logic level 1 and from a logic level 1 to logic level 0, a threshold comparator 206 for generating a reference threshold value and comparing the number of transition edges detected by the edge detector 204 with the reference threshold value, a position address generator 212 for generating a position address with respect to 1/N phase by sampling the received data at an N-time frequency, a position memory 208 for storing the position value with respect to each position address of the received data, a maximum position detector 210 for detecting a maximum position by continuously comparing a position value having the highest frequency of transition edges with respect to each position value stored in the position memory 208 with a current position value stored in the position memory 208, a new position generator 214 for continuously generating a new position by comparing the position detected by the maximum position detector 210 with the current position, and a restoring data detector 216 for restoring the potentially corrupted received data into the original data by determining a maximum level value using clock pulses at the center of the symbol data supplied from the position address generator 212 as well as above and below the center of the symbol data.

Figure 8:
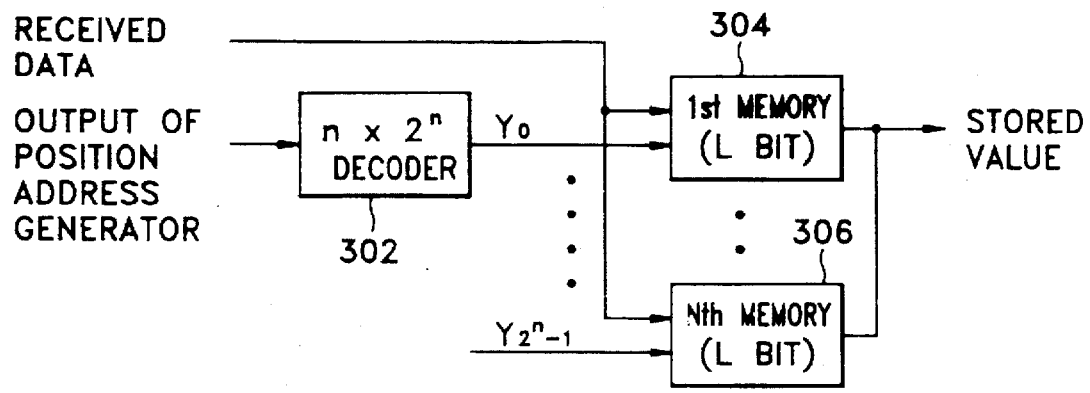
FIG. 8 is a block diagram of a position memory shown in FIG. 7.

As shown in FIG. 8, position memory 208 comprises a decoder 302 and 1 through N memories 304 to 306.

Figure 9:
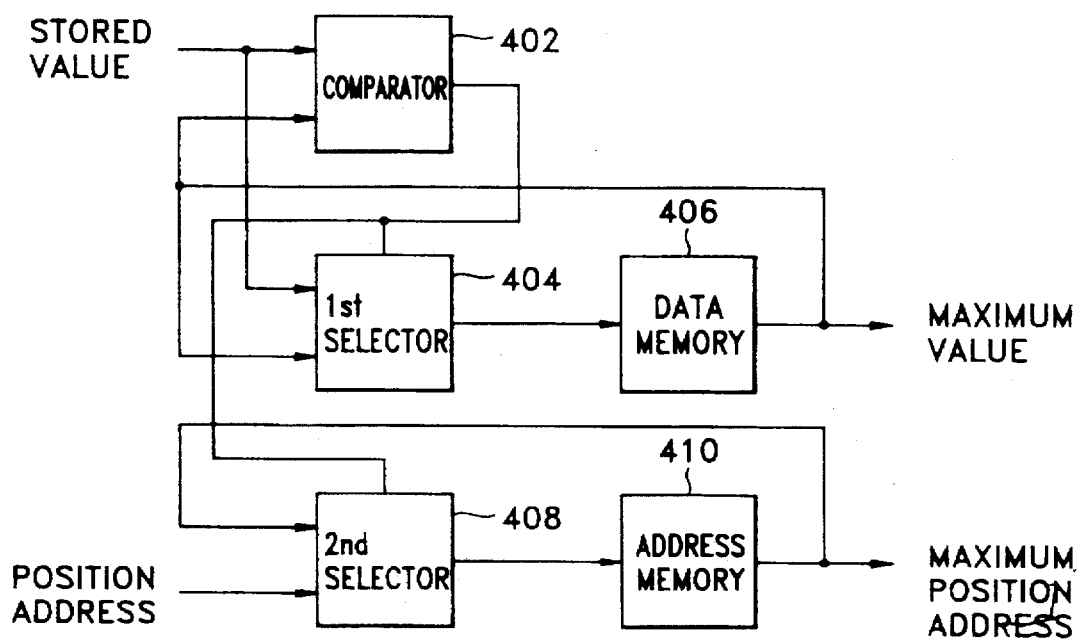
FIG. 9 is a block diagram of a maximum position detector shown in FIG. 7.

FIG. 9 is a block diagram of the maximum position detector 210 shown in FIG. 7. The maximum position detector 210 comprises a comparator 402, first and second selectors 404 and 408, a data memory 406 and an address memory 410.

Figure 10:
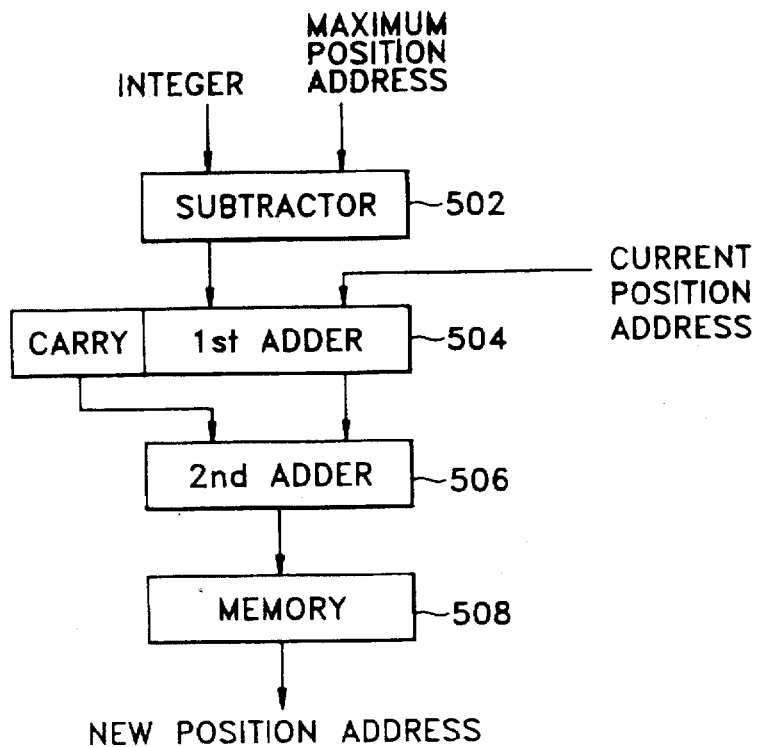
FIG. 10 is a block diagram of a new position generator shown in FIG. 7.

FIG. 10 is a block diagram of the new position generator 214 shown in FIG. 7. The new position generator 214 comprises a subtractor 502, first and second adders 504 and 506, and a memory 508.

Figure 11:
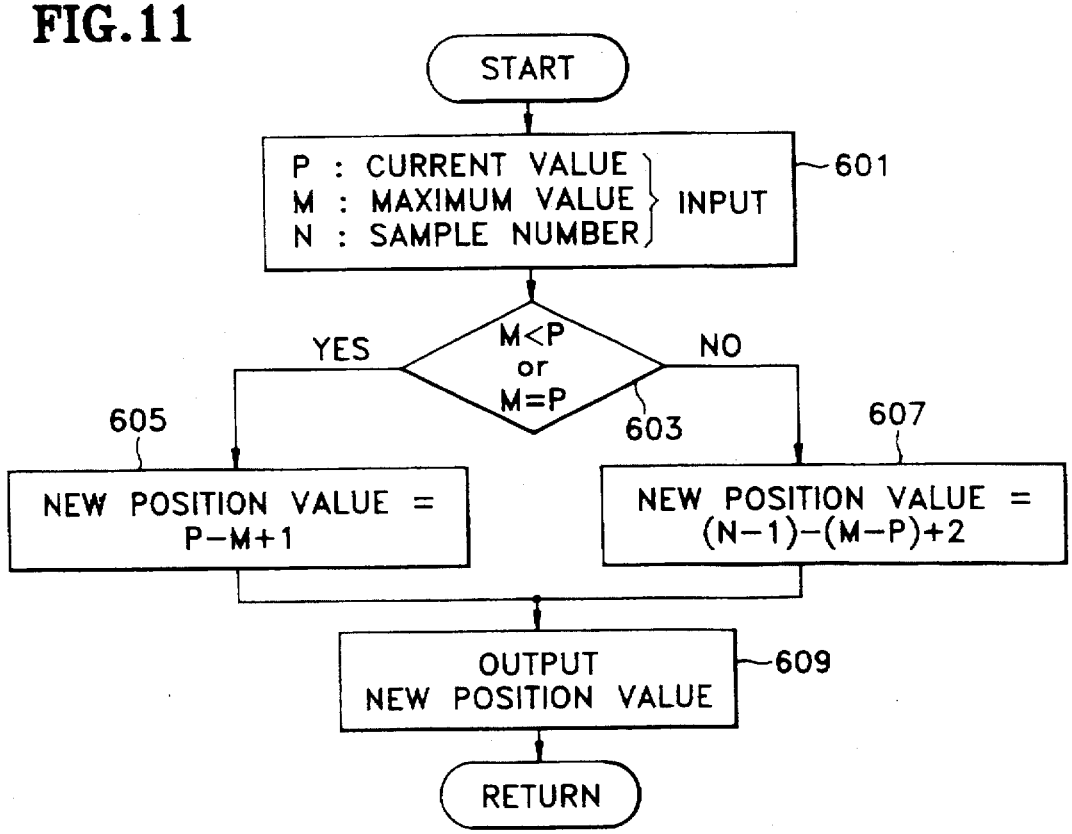
FIG. 11 is a flowchart for illustrating the operation of the new position generator shown in FIG. 9.
Figure 12A:
FIGS. 12A and 12B are diagrams showing examples of a new position value generated according to the flowchart of FIG. 11.
Figure 12B:

FIG. 11 is a flowchart which illustrates the operation of the new position generator 214 shown in FIG. 10, and FIGS. 12A and 12B are diagrams showing examples of a new position value generated according to the flowchart of FIG. 11.

Figure 13:
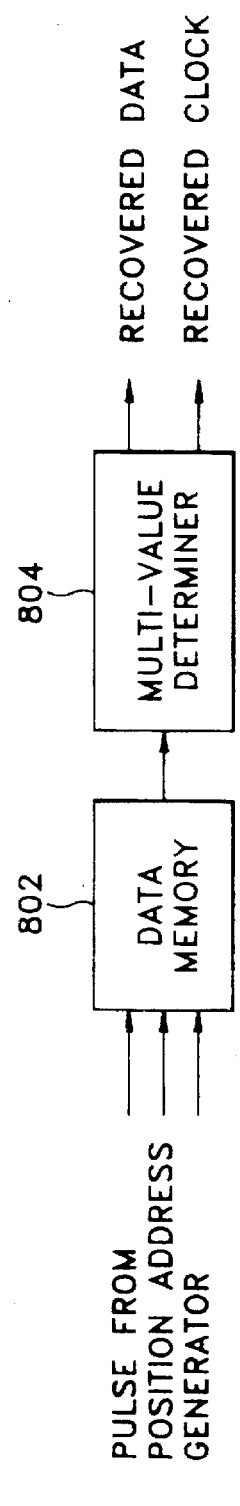
FIG. 13 is a block diagram of a recovered data detector shown in FIG. 7.

FIG. 13 is a block diagram of the recovering data detector 216 shown in FIG. 7. The recovering data detector 216 comprises a data memory 802 and a multi-value determiner 804.

The operation of the digital data recovering apparatus according to the present invention will be described with reference to FIGS. 7 to 13. A received signal transmitted via a communication path may be severely distorted by noise and/or jitter. In order to exactly reproduce the original signal from the received signal at a reception state, various technologies can be utilized. One of those is the PLL method. DPLL is PLL implemented as a digital circuit.

However, in accordance with the present invention, a Top-Down designing method is utilized instead of the DPLL method. In a Top-Down designing method, a function to be implemented is defined by VHSIC hardware description language (VHDL) and then a circuit is automatically generated by a logic synthesizer.

The received data is input in an NRZ signal format so that the level value thereof is logic level 0 or logic level 1. The portion of the received data having a time interval which is much smaller than a basic period (T) of the received data is regarded as a glitch or data distorted by noise, so that the portion of the received data below a predetermined time interval is filtered by the edge detector 204. Then, the transition portion where the state of the data is changed from logic level 0 to logic level 1 and from logic level 1 to logic level 0 is detected by the edge detector 204. Assuming that the period of the received data is $T_d$, when the input data is sampled with a frequency corresponding to N-times the frequency of the received data, a sampling period T is expressed as $T_d/N$. Thus, the glitch having a time interval below T is filtered from the received data. However, if the received data is synchronized with a sampling clock, a very small glitch can be enlarged into a glitch whose time interval corresponds to T. Assuming that the received data at the current time t is D(t), the filtered data becomes D(t–T) and the output of the edge detector 204 is represented as D(t–T)⊕D(t–2T), where the symbol e represents an exclusive OR operation.

Position address generator 212 is utilized for generating a position address for storing each sampled level value when one period of the received data is sampled at an N-time frequency of the frequency of the received data. The position address generator 212 generates the position addresses of each sampled level value from 0 to (N–1) and the clock signals for recovering the data. Here, the clocks required for exactly recovering the input data are ((N/2)–1l)th, (N/2)th and ((N/2)+1)th clocks. Here, N is assumed to be an even number. If, however, N is an odd number, N/2 may be replaced by (N/2)+1. On the other hand, the position address is changed by the new position value generated by the new position generator 214 just after the comparison of the threshold value is completed by the threshold comparator 206.

The position memory 208 is utilized for storing the number at which the transition edge is detected at the position corresponding to each position address generated by the position address generator 212. Here, as shown in FIG. 8, N memories are required and the size of data bit in each memory is determined according to the maximum number transition edges detected. Each memory has a structure in which the data is stored while calculating the number of transition edges to be detected (x=x+1, maximum number is $2^L$, where x is the number of edges to be detected and L is a bit size of the up-counter (not shown)), using an up-counter instead of a RAM. Also, when the maximum programmable threshold value is greater than $2^L$, the position memory 208 has exceeded its capacity, so that a device for normalizing the values stored in whole N memories is utilized. That is, when the maximum programmable threshold value is greater than $2^L$, the values stored in whole N memories are normalized by a modulas-2 operation, so that the size of the hardware required is substantially reduced. At this time, when any one value of the values stored in whole N memories reaches $2^L$, all of the N memories are normalized. For example, when the size of data bit in each memory is set as 6 bit and the stored value of an arbitrary memory reaches "3FH," the value '3FH' is changed into '1FH' by the normalization process.

Threshold comparator 206 programs the reference value of a predetermined threshold to track the received data with an arbitrary speed and compensates for speed differences between the received data and the maximum position detector 210 when the number of the transition edges reaches the threshold value, thereby providing a point in time at which the phase difference is calculated by the new position generator 214. Simultaneously, the threshold comparator 206 resets the value stored in the position memory 208. The threshold comparator 206 comprises a threshold value setter (not shown) and a counter (not shown) for counting the number of transition edges corresponding to the set threshold value. The counter is a down-counter and performs the above operation by regarding the case where a predetermined signal, for example, a borrow signal, is generated as the case where the number of the transition edges to be detected reaches the reference threshold value. By utilizing the down-counter, the up-counter for counting the number of the transition edges to be detected, the threshold value setter and the comparator for comparing the number of the transition edges to be detected with the threshold value are integrally united, thereby reducing the size of the hardware. Also, the reference threshold value can be programmed by the microprocessor of the system, so that the degree of freedom in a function for controlling a fast tracking and a slow tracking in the system is improved.

Maximum position detector 210 detects the maximum value among the number of transition edges to be detected, stored in position memory 208 and the position thereof, as shown in FIG. 9. If the maximum value and the maximum position are detected after the threshold value is obtained, all of the N position memories are compared and the maximum value and the maximum position are detected, so that the calculation becomes complicated and a significant amount of time is required. Therefore, at the same time that the data value is stored in position memory 208, the maximum position detector 210 compares the current position generated from the position address with the position of the previous maximum value, thereby storing the current value and the position thereof if the current value is greater than the previous maximum value and vice versa. That is, the maximum value and the position thereof are determined at the moment when the threshold value is obtained, so that the maximum position detection can be performed in a short time using simple hardware. Here, the determined position is used as basic data for adjusting a new position. The initial values are respectively set as 00H and 0H when the size of the stored data is 6 bit and the position address is 4 bit and are stored in the position memory 208. When the current stored value and a newly input value are the same, the newly input position address is stored in address memory 410 and data memory 406 of FIG. 9 as the same value.

When the maximum position detected by the maximum position detector 210 and the current position of the received data are different, that is, the phase difference between the received data and the sample clock is generated, the new position generator 214 functions to compensate for the phase difference just after the comparison of the threshold value by assigning the new position. An algorithm for assigning the new position is shown in the flowchart of FIG. 11.

In FIG. 11, the new position value is P–M+1 when M is equal to or less than P, and (N–1)–(M–P)+2 when M is greater than P, where P represents a current address value of the position address generator 212, M represents an address value with respect to the maximum position in the maximum position detector 210, and N represents the sampling number per period of the received data. The address value of the new position generator 214 is changed into an address value at a point in time just after the comparison of the threshold value. In the same manner as described with respect to the maximum position detector 210, the address value is not fully obtained after the comparison of the threshold value. That is, a final address value is obtained at the point just after the comparison of the threshold value is completed while comparing the threshold values continuously, so that the final address value is changed into the address value of the new position.

A tracking process with respect to recovered data should be performed in accordance with the speed of the received data input via the above processes. As described above, the position address generator 212 utilizes the (N/2)th pulse so as to recover the data at the center of the symbol data. In order to decrease the error wherein the recovered data is synchronized with a level value which is different from the level value of the original data due to a glitch at the N/2th data, the recovering data detector 216 compares the level values of the data, D(N/2)–1, D(N/2)+1 and D(N/2), which are synchronized at ((N/2)–1)th, ((N/2)+1)th and (N/2)th clock pulses and recovers the data into a maximum level value among these three values, as shown in FIG. 13.

The present invention is utilized in a device for reproducing original data from received data including noise and/or jitter, and particularly, the present invention may be utilized in a digital wire and wireless apparatus, a digital magnetic recording/reproducing apparatus, and the like.

As described above, according to the digital data recovering apparatus of the present invention, the difference between the lead and lag of the phase in the received data and the sample clock is calculated by an arithmetic-statistic method in the same manner as in the general DPLL, so that the phase difference can be exactly compensated. Also, when the transition edge of the received data is detected, the glitch below a period of the sampling frequency of the received data is filtered and the transition edge is detected only with respect to the pulse above the period, so that the data can be recovered exactly.

Also, since the threshold comparator 206 adopts the down-counter, the size of the hardware required can be reduced. And threshold comparator 206 can be reset as an initial state to perform the comparing operation with respect to the next threshold value by readjusting the position address and clearing the position memory, the maximum position detector and the address memory once the comparison of one threshold value is completed.

Also, the position memory 208 counts the number of the transition edges to be detected using the up-counter. Particularly, when the edges of $2^L$ occurs at a position memory, where L represents the bit size of the memory, the position memory 208 normalizes the data value stored in all of the N memories, thereby optimizing the hardware.

Also, in the maximum position detector 210, a process to detect the maximum value and the position thereof is performed continuously per each input data, so that the processing time is reduced and the hardware is simplified.

In addition, the new position generator 214 sets the position of the position address generator 212 uniformly from 0 to N−1 using the algorithm for comparing the detected maximum position with the current position of the position address, so that a period of the data can be effectively understood. Also, the frequency of the received data which may be greater or less than a period of the data due to the noise and/or jitter is already known and the data is sampled with an upper clock corresponding to N-time of the frequency of the received data, where N is an integer, so that the received data can be exactly recovered into the original data.

In addition, the position of the received data is readjusted by newly assigning the address of the position address generator 212 with the address value generated from new position generator 214, so that the original data can be easily recovered. Since the clock pulse for recovering the data is variably generated according to the newly-determined position, the clock pulse adaptively corresponds to the received data.

Also, when recovering the received data, the three data level values are compared using the clock pulses provided from the position address generator 212, which are positioned at the center of the symbol data as well as above and below the center, so that the maximum level value is determined. As a result, the error generated when recovering the original data can be minimized and the reliability of the recovered data can be improved.

What is claimed is:

1. A digital data recovering apparatus comprising:

an edge detector for detecting an edge where the state of received data changes from logic level 0 to logic level 1 or from logic level 1 to logic level 0;

a threshold comparator for generating a reference threshold value and comparing the number of the edges detected by said edge detector with the reference threshold value;

a position address generator for sampling the received data at N-time frequency of the received data and generating a position address with respect to 1/N phase;

a position memory for storing the position value of the received data with respect to each position address thereof;

a maximum position detector for detecting a maximum position by continuously comparing a position value having the maximum value of the edges to be detected with respect to each position value stored in said position memory with a previous maximum position value stored in said position memory;

a new position generator for continuously generating a new position by comparing the maximum position detected by said maximum position detector with a current position; and a recovered data detector for recovering original data from the received data by determining a maximum level value using the clock pulses at the center of symbol data supplied from said position address generator as well as above and below the center.

2. The digital data recovering apparatus as claimed in claim 1, wherein said edge detector samples the received data with N-time frequency and filters a glitch component below a sampling period T expressed as $T_d/N$ from the received data, wherein $T_d$ is a period of the received data and the received data is sampled with a frequency corresponding to N times the speed thereof.

3. The digital data recovering apparatus as claimed in claim 2, wherein the output of said edge detector is a signal obtained by performing an exclusive OR operation with respect to the detected edge and the filtered data.

4. The digital data recovering apparatus as claim in claim 1, wherein said threshold comparator compares the threshold value with the frequency of the edge while decreasing the threshold value previously set by a program using a down-counter.

5. The digital data recovering apparatus as claimed in claim 4, wherein the set threshold value can be repeatedly used unless being changed by a program.

6. The digital data recovering apparatus as claimed in claim 1, wherein said position address generator generates a position address required for storing N phase data and ((N/2)−1)th, (N/2)th and ((N/2)+1)th clocks required for recovering the data, by sampling the received data with N-time clocks.

7. The digital data recovering apparatus as claimed in claim 6, wherein said position memory comprises N memories adopting an up-counter for counting the frequency of the edges and storing thereof.

8. The digital data recovering apparatus as claimed in claim 1, wherein said new position generator represents a new position value as P−M+1 when M is equal to or less than P and as (N−1)−(MP)+2 when M is greater than P, where P represents a current address value of said position address generator, M represents an address value with respect to the maximum value of said maximum position detector and N represents the sampling number with respect to a period of the data.

\* \* \* \* \*